United States Patent [19]

Steffen

[11] 3,912,121

[45] Oct. 14, 1975

[54] CONTROLLED POPULATION MONITOR

[75] Inventor: Ronald W. Steffen, Chatham, Ill.

[73] Assignee: Dickey-john Corporation, Auburn, Ill.

[22] Filed: Aug. 14, 1974

[21] Appl. No.: 497,221

[52] U.S. Cl. ................................................ 221/13
[51] Int. Cl.² .......................................... A01C 7/18
[58] Field of Search ............ 221/9, 7, 12, 13; 111/1; 340/259

[56] References Cited
UNITED STATES PATENTS
3,723,989    3/1973    Fathauer et al. ..................... 340/259
3,855,953    12/1974   Fathauer et al. ........................ 111/1

*Primary Examiner*—Stanley H. Tollberg
*Attorney, Agent, or Firm*—Olson, Trexler, Wolters, Bushnell & Fosse, Ltd.

[57] ABSTRACT

The embodiment of the invention disclosed herein is directed to a controlled population monitor which controls the population density of seeds delivered from a dispensing hopper to furrows formed in a field. Seed dispensing means associated with the hopper direct seeds toward the ground and includes seed-sensing apparatus for sensing the seeds actually delivered to the furrow, and to produce a signal corresponding to the number of seeds sensed. A distance sensor is provided with means for producing pulses corresponding to the linear distance travelled which are modified for producing pulses corresponding to the distance travelled times the width between rows. The pulses produced by the seed sensor and the pulses produced by the distance sensor are compared to determine whether or not the desired population density is being obtained. Should the population density deviate from that desired, the planting apparatus is automatically adjusted to either increase or decrease the number of seeds delivered to the furrows. This will allow constant density of seed population to be maintained regardless of changes in planter efficiencies.

18 Claims, 11 Drawing Figures

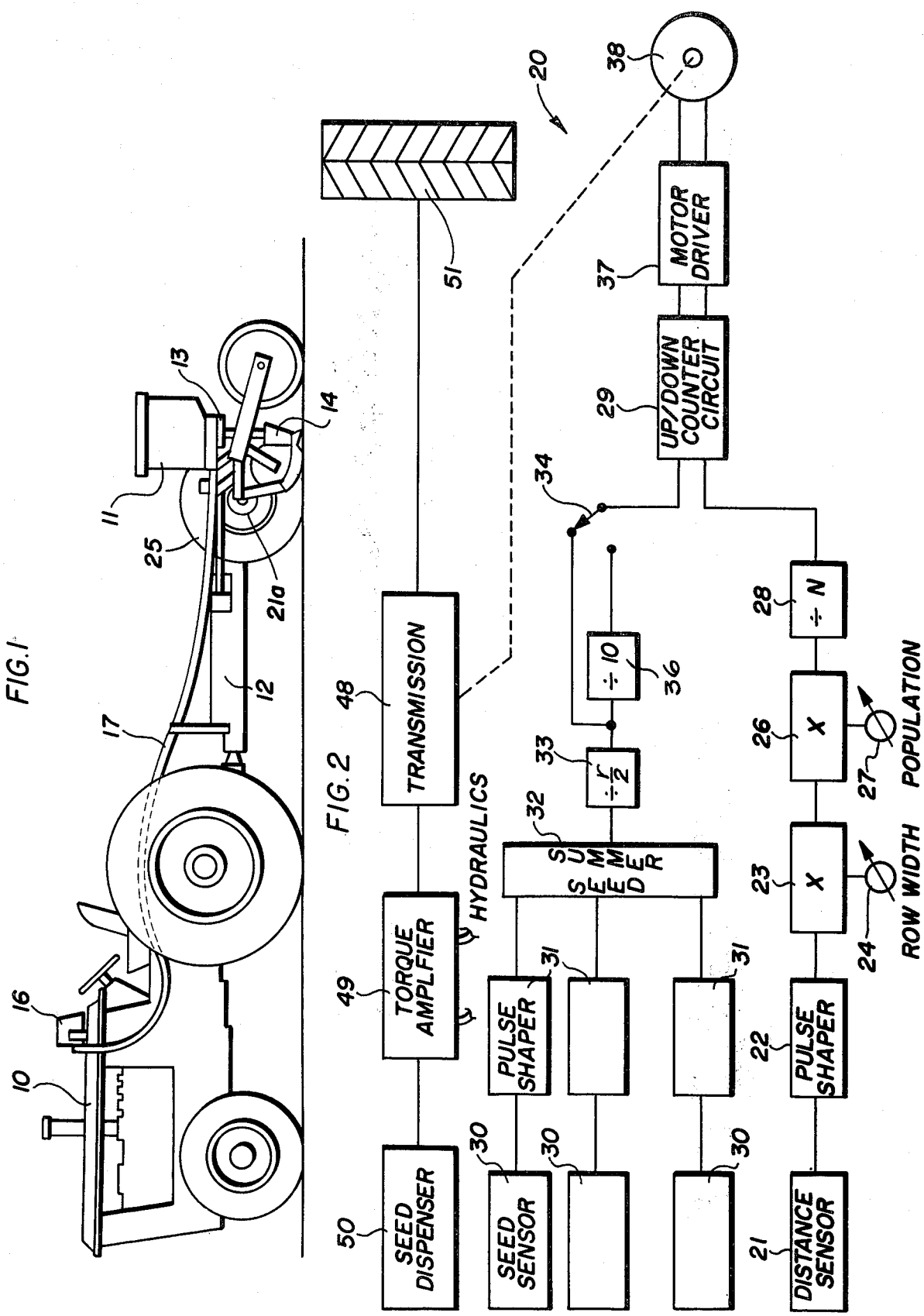

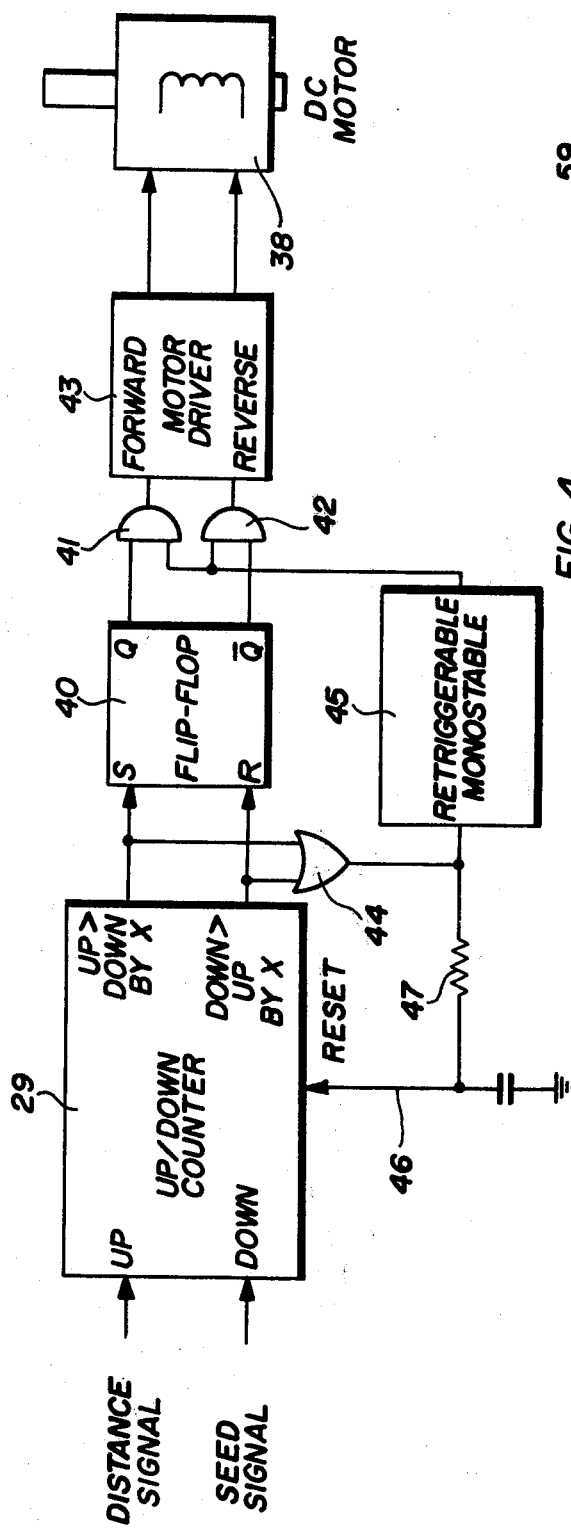
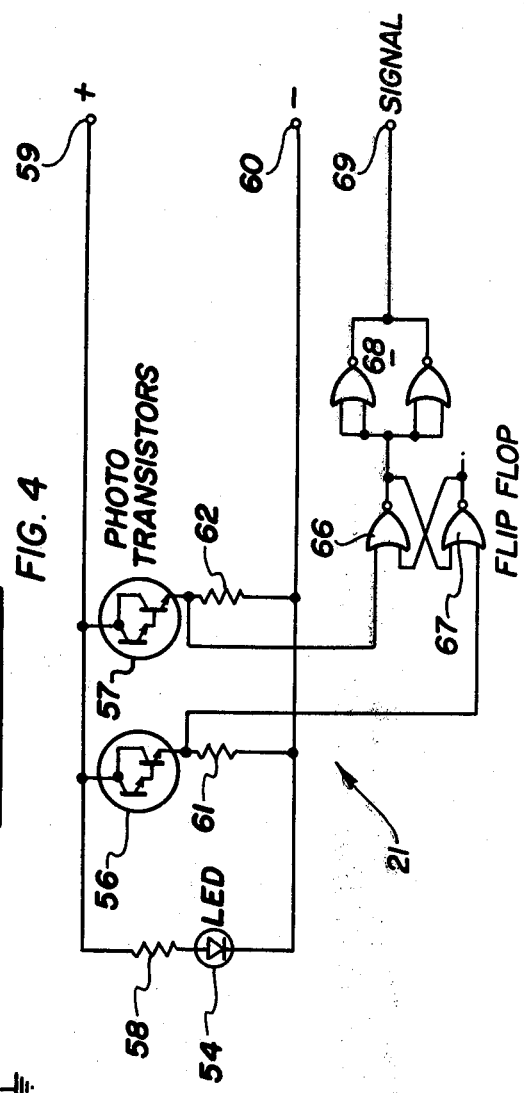
FIG.3
FIG.4

CONTROLLED POPULATION MONITOR

BACKGROUND OF THE INVENTION

This invention relates generally to seed planting apparatus, and more particularly to a controlled population monitor which automatically controls and maintains a preselected density of population of seeds delivered to furrows formed in a field.

Present day farming techniques include, among other things, the automatic planting and harvesting of crops. The planting of seeds to establish a crop field is often accomplished by driving a tractor, or other suitable vehicle, while pulling a seed dispensing device, preferably several such devices extending transversely of the direction of travel of the tractor, while seeds are continuously dispensed into a corresponding number of furrows formed in the field. This automatic seed dispensing apparatus is generally driven by a drive wheel which is part of the planter. In such prior art automatic seed dispensing devices the rate at which seeds are dispensed can be altered by manually setting the drive coupled to the seed dispenser.

In order to obtain the maximum yield per acre, a farmer must accurately control the number of seeds planted per acre. To accomplish this in the past the farmer would incorporate a counter device at the seed dispenser of the planter and count the number of seeds being dispensed. During this period of counting the farmer would either manually or automatically incorporate means to calculate the distance travelled so he could determine the area covered. After travelling a predetermined distance during which time seeds are planted, the farmer can then calculate the density of population of seeds for the small area. If the density of population is in accordance with his prescribed yield for that particular field, the farmer may continue his planting operation without change. However, if adjustment is to be made to the planting equipment the farmer must make it at this time and take a second sampling of the number of seeds dispensed during travel over another prescribed area. While being somewhat of an automatic system for the planting of seeds this arrangement has the disadvantage in requiring substantial amounts of time for setup and checking before continuous planting operation can commence. Furthermore, the accuracy of the population density of the plants planted in this manner is at best only a close approximation because of the possibility of very closely spaced seeds being dispensed in a manner to produce coincident seed count pulses which would register as a single seed count.

SUMMARY OF THE INVENTION

Accordingly, it is an object of this invention to provide a new and improved controlled population monitor which automatically makes changes for the number of seeds dispensed in accordance with sensing the number of seeds counted and the distance travelled over the ground.

Another object of this invention is to provide a controlled population monitor system wherein the desired density of seed population is selected without the need of sample runs over the intended planting field, and wherein the density of population can be altered from time to time as desired.

Still another object of this invention is to provide a new and improved controlled population monitor wherein the counting of seeds is more accurately obtained in that overlapping seed count pulses can be distinguished to produce separate seed count signals.

Still another object of this invention is to provide a controlled population monitor with a new distance sensing apparatus which more accurately produces distance pulses and is free of extraneous signals due to noise and vibration.

Yet another object of this invention is to provide a new and improved controlled population monitor which is efficient and reliable in operation and, particularly from the user's standpoint, simple to operate.

Controlling the number of seeds planted in a given area requires equipment which can count the seeds planted and sense the distance or area in which the seeds were planted. The control unit of this invention evaluates this information and compares it with the desired population which is set into the monitor. This desired population is programmed into the controlled population monitor by a selector switch and any error signal that is produced is used to correct the seed dispensing rate, either increasing it or decreasing it as the case may require. The seed sensor is installed in a location such that it will detect every seed which is dispensed from the seed sensor and, in the case of a plurality of seed dispensers there are a corresponding plurality of seed sensors.

The controlled population monitor further includes multiplier circuit means for receiving the distance pulses as they are produced and multiplying the distance pulses according to the width between rows. This width is measured in inches. The distance pulses indicate a linear distance travelled of the vehicle while the width pulses represent the number of inches between rows. The multiplier circuit of this invention is selected to produce a pulse output for each inch of width between rows. Therefore if the rows are 20 inches apart the multiplier circuit will produce 20 pulses for each distance pulse. On the other hand, if the rows are 40 inches apart the multiplier circuit will produce 40 pulses for each distance pulse. The multiplier circuit includes decade counters which make it possible to dial in the row width in inches. One of the dials may be calibrated in units while the other dial calibrated in 10's. A simple diode matrix can also be used to dial in specific row widths with a single dial.

The output of the row width multiplier circuit is fed to the input of a population multiplier which is a circuit similar to that of the row width multiplier. However, it consists of three decade counters which are again programmed from the control unit panel by three dials. The three decade dials program the population multiplier in units of hundreds of seeds per acre. Therefore, when 20,000 seeds per acre are to be planted, the number 200 is dialed in the three dials, one representing the units of 10,000, another representing units of 1,000, and still another representing units of 100. Thus 200 pulses are generated for every pulse from the row width multiplier.

The output from the population multiplier is divided by a predetermined number N which is selected to bring the output pulse rate of the population multiplier equal to twice the seed rate from any of the seed sensors if and only if that seed dispenser is dispensing at the correct rate as dialed in the population multiplier selector switches. The output of the divider is the distance input into an up-down counter circuit which also receives seed signals. The seed signal from each seed sensor is processed in a pulse-shaping circuit to substantially eliminate the possibility of overlapping pulses obscuring one another. A complete seed dispensing system may consist of r number of rows thus having an r number of seed sensors associated therewith. Each processed seed signal is fed into a seed-summing circuit wherein all of the seed signals are added and the number of output pulses equal to the total number of pulses from all the r rows is obtained. The output of the seed-summing circuit is divided by $r/2$, and if all of the seed dispensers are dispensing at an equal rate, the output rate from the divisor is twice the rate of any of the rows.

The processed seed signal and the processed distance signal are fed into the up-down counter wherein the seed signals count the counter down and the distance signals count the counter up. When the up counts exceed the down counts by a predetermined number a logic circuit is set, and a retriggerable monostable gate circuit will pass the output from the logic circuit to a motor drive circuit for either increasing or decreasing the rate at which seeds are delivered to the furrows. In the illustrated embodiment the control circuit is used to operate a DC electric motor which varies the drive ratio of a transmission which is driven by the planter drive wheel. A hydraulic torque amplifier is used between the output of the transmission and the seed sensor to reduce the torque requirements for operating the transmission.

Still another feature of the invention is the utilization of light-emitting diode and photo-responsive transistors in an arrangement which operates in a flip-flop fashion so that extraneous pulse signals can be eliminated. This is accomplished by requiring two distinct signals for each distance pulse. Furthermore by providing wave-shaping circuits between the seed-counting sensors and the seed-summing circuits the possibility of overlapping seed pulses is substantially reduced and a more accurate seed count is obtained.

Many other objects, features and advantages of this invention will be more fully realized and understood from the following detailed description when taken in conjunction with the accompanying drawings wherein like reference numerals throughout the various views of the drawings are intended to designate similar elements and components.

BRIEF DESCRIPTION OF THE DRAWINGS

FIG. 1 is an elevational view showing a tractor pulling a seed planting hopper and illustrates the various components necessary to operate the controlled population monitor in accordance with this invention;

FIG. 2 is a simplified block diagram of the overall system of the controlled population monitor of this invention;

FIG. 3 is a detailed block diagram of the up-down counter circuit used within the control system shown in FIG. 2;

FIG. 4 is a detailed schematic view illustrating a distance-measuring circuit constructed in accordance with this invention;

DETAILED DESCRIPTION OF THE ILLUSTRATED EMBODIMENTS

Figure 5:
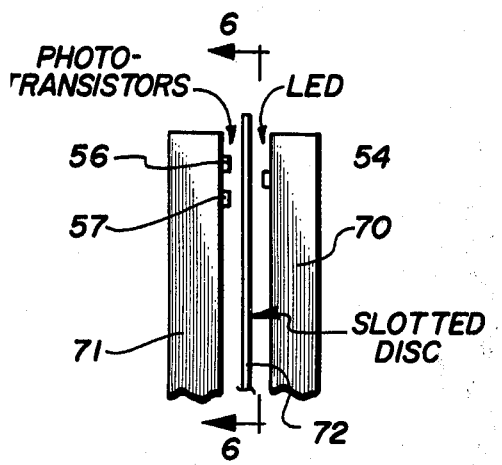
FIGS. 5 and 6 represent the structural requirements for the distance-measuring circuit of FIG. 4.

Referring now to FIG. 1 the basic components of the controlled population monitor of the present invention are illustrated. Here a tractor 10, or any other suitable vehicle, is utilized to transport a hopper 11, or a plurality of such hoppers extending transversely of the direction of travel of the tractor, over a field to be planted. The connection made between the tractor 10 and hopper 11 can be by any suitable arrangement, here being illustrated by means of a tow-bar 12 which may include a rotary shaft and hydraulic pump arrangement for operating hydraulically drive motors associated with the dispensing portion of the hopper 11. Positioned at the lower portion of the hopper 11 is a seed dispensing mechanism which directs the seeds to be planted downwardly into furrows formed in the field. The seed dispensing mechanism can be operated by a variable speed drive means such as a variable speed hydraulic motor or the like. Immediately beneath the seed dispenser 13 is a seed sensor 14 which produces an electrical signal, preferably in the form of a pulse signal, for each seed actually passing therethrough en route to the furrow. Therefore, an electrical signal is generated in response to seeds actually dispensed. Mounted on the tractor 10, in any convenient location for manipulation and observation by the tractor operator, is a control and monitor unit 16 which is coupled to the seed dispenser and seed sensing devices through a control cable 17. However, it will be understood that other means for coupling the monitor and seed dispensing and sensing equipment may be incorporated.

In operation, the farmer need merely start the tractor, set the desired information into the control unit 16 as to the density of population of seeds desired, and then pull the hopper or hoppers behind the tractor at any desired speed. The rate of movement of the tractor over the ground is detected by a distance-measuring device which produces pulse signals which are delivered to the control and monitor unit 16 for comparison with control signals generated by the seed sensor 14. These two signals are then used to control the rate of operation of the seed dispensing equipment 13 thereby automatically maintaining a desired density of seed population over the field being planted regardless of variations in planter efficiency. Should the number of seeds being planted vary as a result of a change in rate of operation of the device controlling the seed dispensing unit, or as a result of a malfunction of this seed dispensing unit, a corresponding control signal will be developed to vary the operation of the seed dispenser so that a constant density of seed population is maintained or to give a warning signal to the operator that a malfunction has occurred.

Referring now to FIG. 2 there is seen a simplified block diagram of a controlled population monitor constructed in accordance with the principles of this invention and is designated generally by reference numeral 20. The controlled population monitor 20 includes a distance sensor 21 for producing pulses corresponding to a predetermined linear distance travelled by the planter. These pulses are fed to a pulse-shaping circuit 22 and therefrom to a row width multiplying circuit 23. The distance pulses are a measure of linear distance and when the pulses are multiplied by the row width multiplier 23 they produce an output signal which is proportional to the area being planted by one seed dispenser. The row width multiplying circuit 23 consists of decade counters that are programmed by a dial or dials indicated generally by reference numeral 24 to be located on the panel of the controlled population monitor. In the illustrated embodiment the row width multiplying circuit 23 produces an output pulse for each inch of width between the rows. Therefore when the distance between rows is 20 inches the pulse width multiplier will produce 20 pulses for each pulse delivered from the distance sensor 21. On the other hand, when the row width is 40 inches the row width multiplier will produce 40 pulses for each pulse produced by the distance sensor 21. Therefore the decade counters associated with the row width multiplying circuit 23 make it possible to dial in a row width of any desired dimension, here being in increments of inches. If a single row-width control knob is to be used for the control knob 24 a simple diode matrix circuit arrangement may be used.

The output of the row width multiplier circuit 23 is delivered to the input of a population multiplier circuit 26 which, in turn, has a similar circuit configuration and consists of three decade counters which are controlled by a panel of three dials designated generally by reference numeral 27. Here also a single dial can be used for the population multiplier by the incorporation of a simple diode matrix circuit arrangement. The three decade dials utilized to program the population multiplier 26 are arranged in hundreds of seeds per acre. Therefore when 20,000 seeds per acre is desired the number 200 is dialed in on the three dials, one representing units of 10,000, another representing units of 1,000 and the third representing units of 100. Therefore 200 pulses are generated for every pulse from the row width multiplier. When the row width multiplier is set at 20 inches and the population multiplier 26 is set at 200, corresponding to an actual population of 20,000 seeds per acre, the resulting output from the population multiplier 26 is 4,000 pulses for each distance pulse obtained from the distance sensor 21. This is then divided by a number N within the divider circuit 28 and delivered to the down-side of an up-down counter circuit 29. In the illustrated embodiment number N is selected to provide an output pulse rate which is twice the pulse rate of the seed sensor if and only if the seed sensor is dispensing seed at the correct rate as dialed into the population multiplier. Therefore the output of the divisor 28 is a distance control signal which depends on the rate at which the signals are obtained.

The controlled population monitor 20 further includes a plurality of seed sensors 30 which correspond in number to the number of rows of seeds being planted. Here the number of rows is designated by $r$ and each of the seed sensors has the output thereof connected to a pulse-shaping circuit 31 which, in turn, are connected to a seed summer circuit 32 for producing an accumulative pulse train having pulses corresponding to the number of seeds sensed by all of the sensors 30. Each of the seed signals is then fed from the summer to a divider circuit 33 which divides this information by a factor of $r/2$. If all the dispensers are operating at an equal rate the output rate from the divisor circuit 33 will be twice the rate of any single row. The output of the divisor circuit 33 is then delivered to the up-side of the up-down counter 29 through a selector switch 34 which alternately connects the up-input terminal of the counter 29 between the divisor 33 and a divider 36 which is a divide by 10 circuit.

The seed signal information and the distance signal information are now present on the up and down input terminals of the up-down counter 29. When the up counts exceed the down counts by a predetermined number a flip-flop circuit located within the motor drive circuit 37 is set and a DC drive motor 38 is driven in one of two directions.

For a better understanding of the up-down counter and drive motor circuits 29 and 37 reference is now made to FIG. 3 which illustrates a flip-flop circuit 40 connected to the output of the up-down counter 29 and is placed in a set condition when, as mentioned above, the up counts exceed the down counts by a predetermined number. A retrigerable monostable gate circuit 45 applies an input signal to a pair of AND gates 41 and 42 to allow transfer of the signal developed by flip-flop circuit 40 to a motor drive circuit 43. The Q output of the flip-flop circuit 40 activates the motor drive in such a manner as to rotate the motor in the direction to increase the rate at which seeds are dispensed. On the other hand, the $\overline{Q}$ output of the flip-flop circuit 40 is arranged to energize the motor to decrease the rate at which seeds are dispensed. When the down counts exceed the up counts the flip-flop circuit 40 is reset and the monostable circuit 45 is triggered to decrease the rate at which seeds are delivered. It will be noted that the up-down counter is reset every time the monostable trigger circuit 45 is triggered through the OR gate 44 which has its output connected to a reset line 46 of the up-down counter through a resistor 47.

Referring once again to FIG. 2, the DC electric motor 38 is connected to a transmission 48 which, in turn, is connected to a torque amplifier circuit 49. The torque amplifier 49 controls a hydraulic system which, in turn, controls the rate at which a seed dispenser mechanism 50 is operated. Therefore, should the monitor system 20 detect seeds being planted at a greater rate than desired the seed dispenser 50 will be slowed down. Conversely should the monitor system 20 detect seeds being planted at a lesser rate than desired the seed dispenser 50 will be increased in speed. By utilizing the torque amplifier between the seed dispenser and the transmission 28, the amount of torque required from the transmission and accordingly the amount of torque to be developed by a planter drive wheel 51 is reduced, as is well-known in the art.

While many types of distance-sensing devices 21 can be utilized in the controlled population monitor illustrated in this invention, the preferred embodiment contemplates the use of a distance wheel 21a which is driven by a ground wheel 25, FIG. 1. The distance wheel 21a is used to interrupt a light beam between a pair of photo-transistors which are placed on one side of the wheel and a light-emitting diode which is placed on the other side of the wheel. The circuit illustrated herein is intended for use with a distance counter which produces approximately eight pulses per foot of travel of the planter. The distance wheel utilized by the illustrated embodiment will travel 83.5 inches per revolution, which is approximately 7 feet, and produce 56 pulses for each revolution of the distance wheel.

Figure 6:
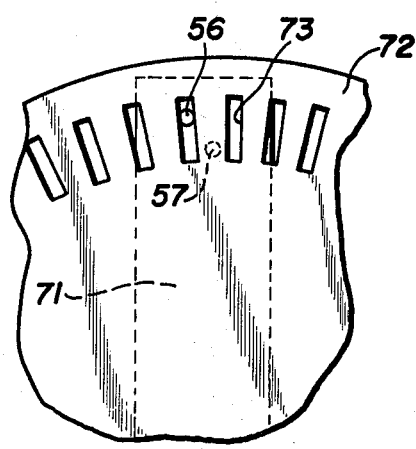

In the illustrated embodiment FIG. 4 shows a photoelectric sensing arrangement which includes a light-emitting diode 54 connected in circuit with a pair of photo-transistors 56 and 57. The light-emitting diode 54 is in series with a current-limiting resistor 58 and the entire circuit receives operating power from a pair of terminals 59 and 60 connected to plus and minus terminals of a battery source or the like. The light-responsive photo-transistors 56 and 57 are here illustrated as cascade-connected transistors which have their emitter electrodes connected to current-limiting resistors 61 and 62, respectively, and to one input of a pair of cross-coupled OR gate circuits 66 and 67. The OR gate circuits have inverter means at their output and function as a flip-flop circuit. The output of this flip-flop circuit is then coupled to a gate circuit designated generally by reference numeral 68 and therefrom to an output terminal 69. This circuit configuration is reliable and simple in construction. To obtain two discrete signals for each increment of distance travelled of the distance wheel in light-emitting diode 54 is mounted on one side of a support bracket 70, as best seen in FIG. 5. Also the photo-transistors 56 and 57 are mounted on a second support bracket 71 and a slotted disk 72 is rotatably positioned between the support brackets. The disk 72 has a plurality of arcuately displaced rectangular slots 73, as best seen in FIG. 6, to provide a pulsating output of the photo-transistors 56 and 57 as the slots pass the light-emitting diode 54. The disk 72 has 56 slots formed therein and is mounted on the hub of the distance wheel 25 which has a 83.5 inch circumference. Therefore, in this embodiment the distance pulses generated by the photo-transistors correspond to 1.5 inches of travel of the planter. The two photo-transistors are spaced a half slot distance apart and the photo-transistors are thus alternately triggered as the slotted disk rotates. One photo-transistor sets the flip-flop circuit formed by gates 66 and 67 while the other phototransistor resets the flip-flop circuit. Continuous movement in one direction is necessary to set and reset the flip-flop circuits. When the distance wheel stops, vibration and other sources of external signals will not produce a false pulse output from the distance sensor.

Figure 7:
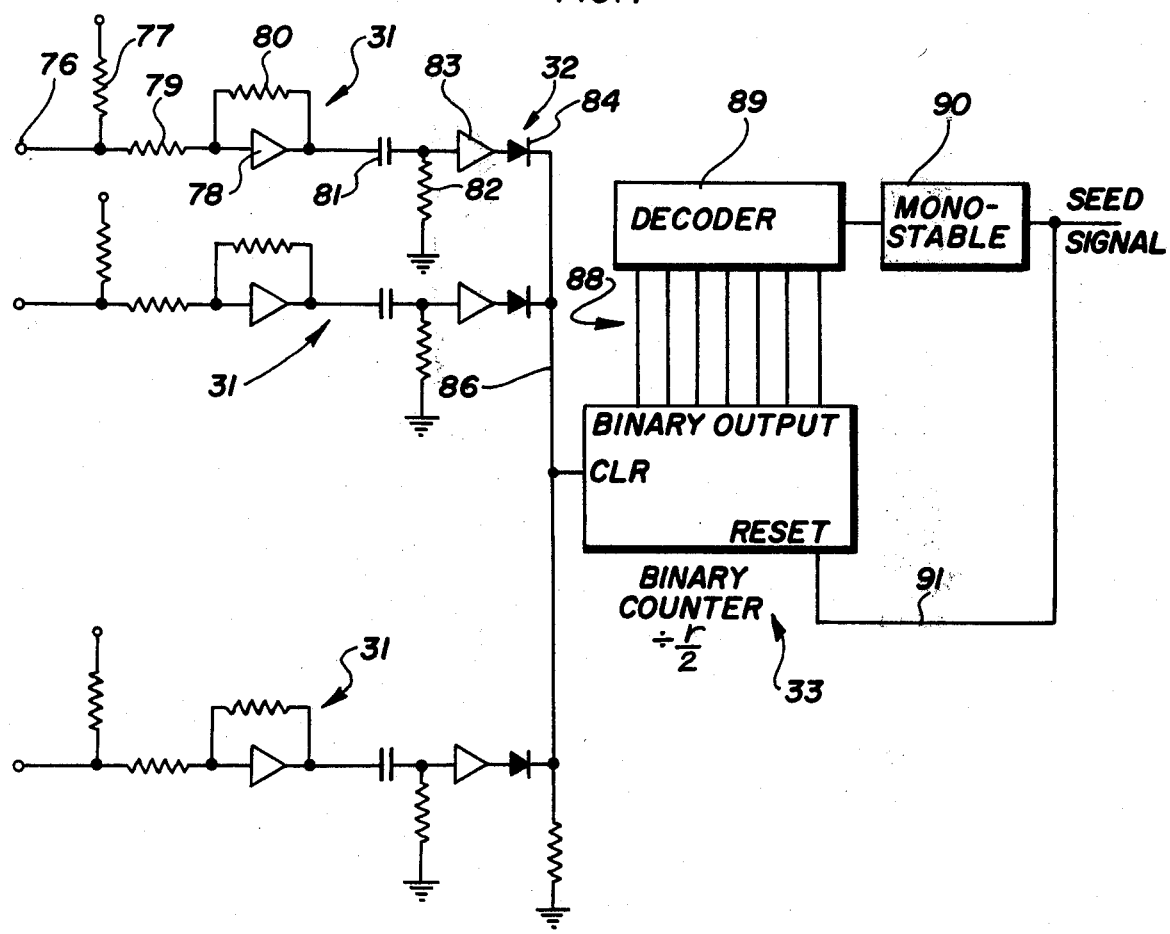
FIG. 7 is a schematic diagram of the seed pulse shaper, summer and divider circuit utilized in the system of FIG. 2.

In accordance with another aspect of this invention the seed pulse shaper, summer and divider circuits are illustrated in FIG. 7 and are designated by reference numerals 31, 32 and 33, respectively. Since the pulse shapers are all similar in construction only a single pulse shaper will be described in detail. The output of the seed sensor is delivered to a terminal 76 which receives a voltage through a resistor 77 and this signal is delivered to the input of a buffer amplifier stage 78 through a resistor 79. The signals from the seed sensor preferably are driven by an open collector-driver circuit. The buffer amplifier 78 has a feedback resistor 80 connected between the input and output thereof, and this positive feedback shapes the seed pulse to have very fast rise and fall times. The buffer amplifier 78 is followed by a differentiating circuit comprising a capacitor 81 and a resistor 82. This signal is then applied to the input of a second buffer amplifier 83 and the signal is now a very short duration positive pulse. Buffer amplifier shapes this pulse before it is sent through a diode 84 which forms an OR gate along with other similarly arranged diodes of the other pulse-shaping circuits. Connection of the diodes to a common line 86 forms the summer circuit 32. The pulses into the diode 84 are maintained relatively short to prevent coincidental pulses from closely spaced seeds which would provide an inaccurate seed count signal. Accordingly, the shorter the pulse contributed by each row the less probability of overlapping pulses occurring and the greater the accuracy of the signal applied to the clock input of the binary counter 33.

The counter's output binary bit lines 88 are monitored by a logic circuit or decoder network 89 which triggers a one-shot multi-vibrator 90 when a predetermined number has been reached within the counter. The one-shot multi-vibrator 90 resets the counter by a feedback line 91 and transmits a seed signal to the up-down counter circuit 29, FIG. 2. The binary counter 33 divides the signal by a factor of $r/2$. This scales the output such that the seed signal is equivalent to the formation of two rows if all the rows are planting at the same rate. This simplifies the time constant in other parts of the circuit arrangement since the same rate exists no matter how many rows of planters there are as long as they are always a multiple of 2. The decoder 89 may be programmed such that the counter divides by an additional factor of 10 by using a divide by 10 circuit 36. This can increase the dialed-in population by a factor of 10 giving an additional decade range if necessary.

Figure 8:
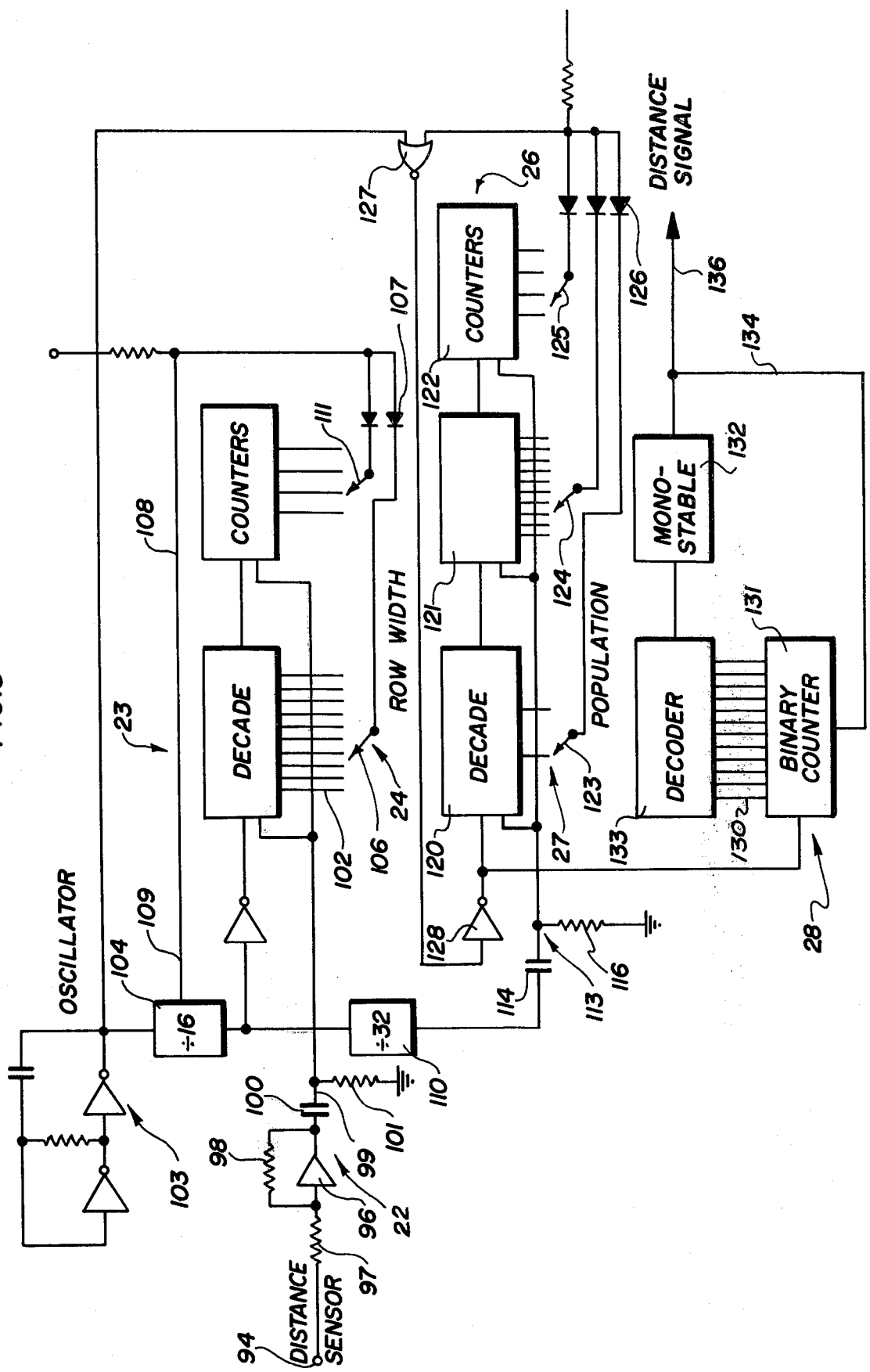
FIG. 8 is a detailed schematic diagram of the distance-processing circuit utilized in the system of FIG. 2.

For a better understanding of the distance-processing circuitry of FIG. 2, the pulse-shaper 22, row width multiplier 23, row width control circuit 24, population multiplier 26, population control circuit 27, and the divide by N circuit 28, reference is now made to FIG. 8. The distance-processing circuit accepts the signals from the distance sensor as applied to an input terminal 94 whereupon it is delivered to a buffer amplifier 96 through a series resistor 97. The buffer amplifier 96 includes a feedback resistor 98 to substantially decrease the rise and fall time of the distance pulses. The output of the buffer amplifier 96 is delivered to a differentiator circuit 99 comprising a capacitor 100 and a resistor 101. The differentiating circuit 99 gives a short positive pulse which resets the row width decade counter. After the reset pulse has been applied to the decade counter the decimal lines 102 will indicate a zero. A 100 KHz oscillator circuit 103 has its output delivered through a divide by 16 binary divider circuit 104. When the decimal lines 102 go high this will place a reset signal on a switch contact 106 which is then delivered through a diode 107 to the line 108 and back to the reset input terminal 109 of the divide by 16 counter 104. This action will terminate counting of the counter 104 until another distance signal is received from the differentiating circuit 99. The number of pulses sent to a divide by 32 binary counter 110 is determined by the number of pulses dialed in the row width switches 24 here being represented by the switch contacts 106 and 111. Switch contact 106 represents the units while switch contact 111 represents the tens. If the number 30 is dialed in the row switches 24, thus representing a row width of 30 inches, 30 pulses will be sent to the divide by 32 binary counter 110 for every reset pulse obtained from the differentiating circuit 99. After 30 pulses are received the divide by 16 binary counter is held at zero. The circuit then sits in the waiting condition for another distance pulse as mentioned above.

The divide by 32 counter accepts the grouped pulses and provides output pulses which are more consistent in spacing although, they are also divided by 32. The output of the divide by 32 counter is delivered to a differentiating circuit 113 comprising a capacitor 114 and a resistor 116 which is the input to the population multiplier circuit 26. The short positive pulses from the differentiating circuit 113 reset the population counter 26 and the population counter works in much the same manner as the row width circuit 23. However, the population counter has three decade counters instead of two, they being the decade counters 120, 121 and 122. In the illustrated embodiment the highest number that can be dialed into the population counter is 395, this being obtained in multiples of five. The population readout will produce indication in multiples of 500. The circuit must be capable of clocking 395 times for each reset pulse obtained from the differentiating circuit 113. The decade counters have their output lines delivered through contact switch elements 123, 124 and 125, respectively, through a diode gate circuit arrangement 126 to one input of a gate circuit 127. The gate circuit 127 has its output delivered through an inverter 128 to the clock input of the decade counter 120.

The signal from the population multiplier circuit consists of groups of pulses which are fed to the binary counter circuit 28. When the bit lines 130 of a binary counter circuit 131 indicate a predetermined number, a one-shot multi-vibrator 132 is triggered as a result of the output of a decoder circuit 133. The triggering of the monostable multi-vibrator 132 resets the binary counter 131 by the feedback line 134 and produces a distance output pulse along line 135. This pulse signal information is delivered to the up-down counter 29, FIG. 2. The predetermined number chosen by the divide by N circuit 28 is such that it corresponds to the rate of the seed pulses from the seed processing circuit if the correct population is being planted. Therefore the up-down counter sees a distance pulse for each seed pulse when and only when the proper seed pulse rate is obtained.

Figure 9:
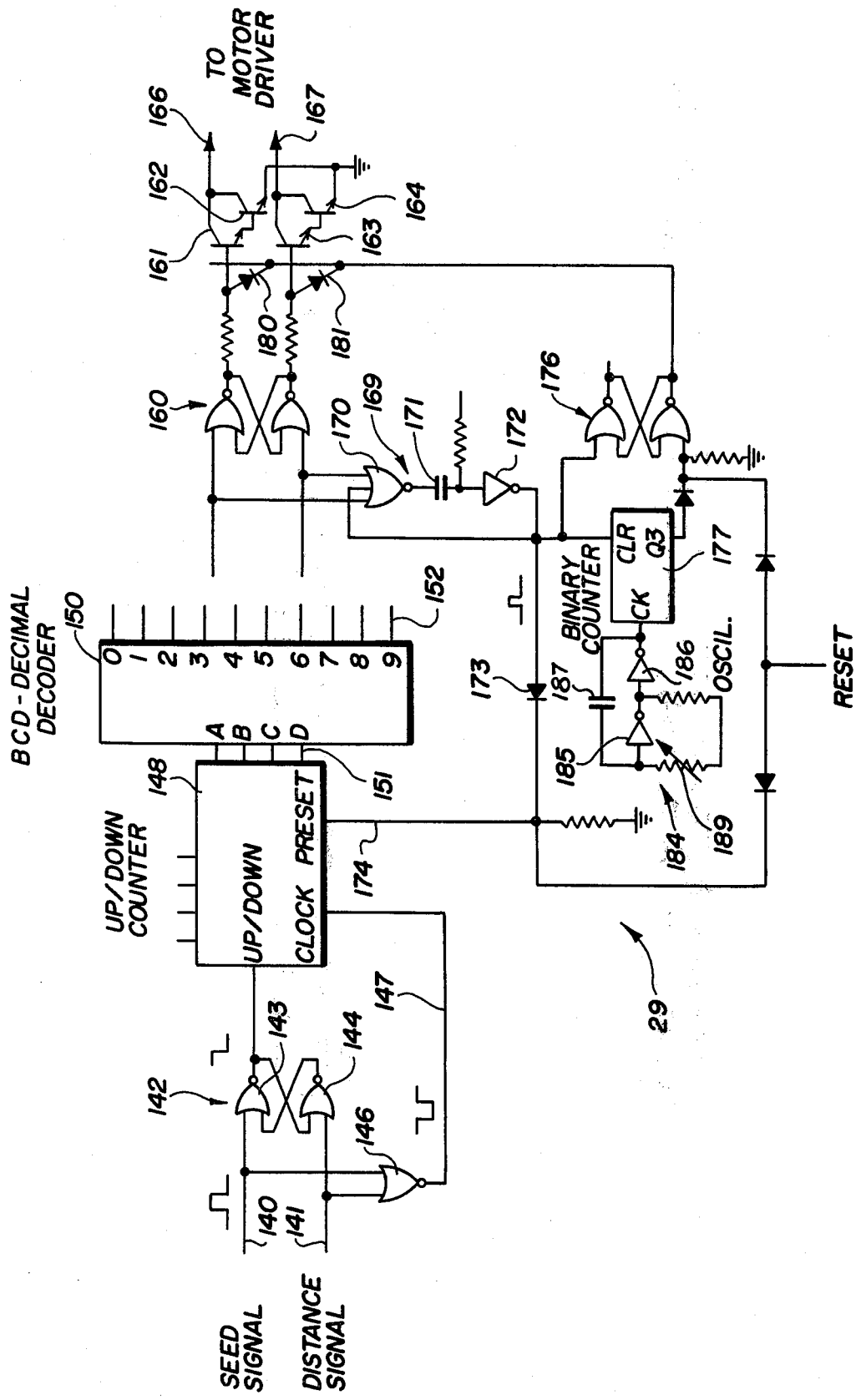
FIG. 9 is a more detailed schematic showing of an up-down counter circuit which can be used in accordance with the principles of this invention.

For a better understanding of the circuit configuration of the up-down counter 29 reference is now made to FIG. 9 which illustrates the details of the circuitry to obtain the desired results for controlling the DC motor 38. The seed signals and distance signals are fed to the up-down counter through a pair of lines 140 and 141, respectively, to the input of a flip-flop circuit 142. The flip-flop circuit 142 is formed by a pair of cross-couple NOR gates 143 and 144. The lines 140 and 141 are also applied to the input of a NOR gate 146 which inverts the signal and applies it to the clock input line 147 of an integrated circuit chip 148. In the illustrated embodiment the integrated circuit chip is a commercially available unit bearing the part number CD4029. The output of the up-down counter 148 is delivered to a binary decimal decoder circuit 150.

The output of the flip-flop circuit 142 indicates to the up-down counter circuit 148 whether to count up or count down. A seed signal will toggle the flip-flop circuit such that the input to the up-down counter will be a 0. This tells the counter to count down. The output of the gate circuit 146 inverts the signal from the incoming seed and distance lines and the counter 148 toggles on the positive edge of the output from the gate 146. Therefore the flip-flop circuit 142 is already set and the correct information is at the terminal of the up-down counter 148 when the counter is clocked. The width of the pulse is the time required to set up the counter. Substantially the same operation occurs when the distance pulses are applied to line 141. Flip-flop circuit 142 is now reset such that the up-down counter terminal is at a logic 1. This tells the counter to count up when clocked. The pulse output from the gate circuit 146 will again clock the counter. Therefore alternate up and down counts applied to the counter will maintain the counter in a substantially zero state.

The output of the counter is initially preset to a BCD 0100 as applied to output lines 151. This is selected to be as close to mid-range as possible for the decade counter. The counter will count up from the binary number 4 if more distance pulses occur than seed pulses. If, on the other hand, more seed pulses occur than distance pulses the binary counter will count down from the binary number 4. The counter is followed by a binary to digital decoder which has 4-line inputs and a 10-line output. Therefore, the state of the counter can be determined simply by observing which line of the decoder is high from between 0 to 9. A 4 output on the binary to decimal decoder indicates a proper seed planting rate. When the seed planting rate increases so also does the number at the output of the binary decoder, for example to 5, 6, 7, 8 or 9. On the other hand, when the seed rate decreases below the desired rate the number 4 also will decrease to 3, 2, 1 or 0.

Because of the nature of the circuitry involved a dead band or null must exist where no action is taken to correct the rate of seed planting. Ideally, if the seed and distance signal rates are equal the counter will toggle between 3 and 4 and 4 and 5, which is an acceptable range of variation. Since, in reality, the seed signal is not periodic, a range must exist where no action is taken and the signal is allowed to correct itself when averaged over a short period of time. The decimal output allows one to program the range of the dead band desired. The upper and lower limits are set by connecting the set and reset lines, respectively, of a flip-flop circuit 160 to the upper and lower decimal lines from the decoder, as indicated by broken lines. Therefore by setting at which point the flip-flop circuit 160 is actuated the dead band is correspondingly selected. The flip-flop circuit 160 attempts to turn on transistors 161, 162, 163 and 164 depending on whether the seed signal is too high or too low to correspondingly run the DC motor connected to the output terminals 166 and 167.

When the dead band or null limits are reached a monostable circuit 169 is triggered. The monostable circuit 169 includes a NOR gate 170 which has its output delivered through a capacitor 171 to the input of an inverter 172. This pulse is delivered through a diode 173 to the preset input line 174 of the counter 148 to set the counter back to the midrange of 0100. The output of the monostable circuit 169 is also delivered to a flip-flop circuit 176, which comprises a pair of cross-coupled gates, and resets a binary counter 177. By setting the flip-flop circuit 176 the cathodes of a pair of diodes 180 and 181 are set to a high potential thereby blocking current flow therethrough and rendering either the transistor group 161 and 162 conductive or the transistor group 163 and 164 conductive to run the DC motor in either the forward or reverse directions.

The binary counter 177 is clocked by a 8 Hz oscillator designated generally by reference numeral 184 and includes a pair of inverters 185 and 186 which has the output thereof connected through a feedback capacitor 187 back to the input of inverter 185. The oscillator frequency can be varied by a potentiometer 189.

When the counter 177 reaches a binary count of 0100 (Number 4) it will reset flip-flop circuit 176, thereby disabling transistors 161, 162, 163 and 164. If another one-shot pulse resets the counter before it reaches the 0100 binary readout flip-flop circuit 176 will not reset the transistors 161, 162, 163 and 164 and the motor control will be operated. Accordingly, this arrangement is considered a retriggerable monostable circuit.

Accordingly, if the seed pulse rate and distance pulse rate are close but not equal, the transistor 161, 162, 163 and 164 will be turned on for a period of time equal to approximately 4 times the clock period of the oscillator circuit 184. When the seed pulse rate and the distance pulse rate are appreciably different, the drive transistors are on continuously to operate the drive motor and correct the situation, either increasing or decreasing the seed rate. As the seed rate and distance rate approach one another the transistors are turned off and then pulsed on less often and less often until the seed rate is the same as the distance rate pulses. As the seed rate and distance rate pulses get very close to one another the transistors are seldom pulsed on. This technique allows linearization of the system to prevent hunting or overshooting.

Figure 10:
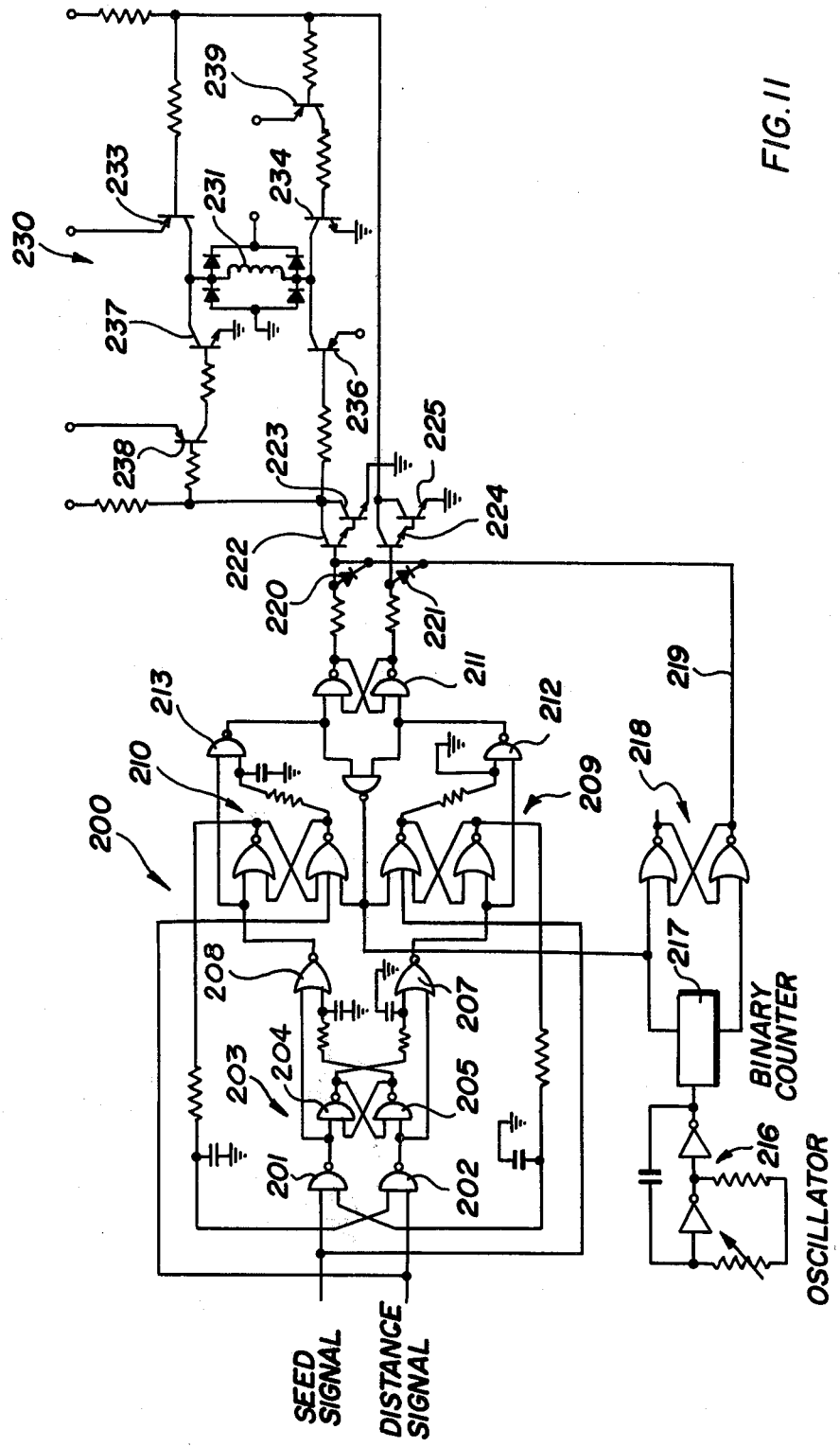
FIG. 10 is an alternate form of up-down counter circuit which can be utilized in accordance with this invention and which here illustrates controlling of the drive motor.

Referring now to FIG. 10 there is seen an alternate circuit configuration which can be used as an up-down counter in accordance with the principles of this invention. Here the alternate up-down counter is designated generally by reference numeral 200 and includes a pair of gate circuits 201 and 202 at the input lines corresponding to the seed signal and distance signals, respectively. The output of the gate circuits 201 and 202 are delivered to a flip-flop circuit designated generally by reference numeral 203 and which consists of a pair of cross-coupled NAND gate circuits. 204 and 205. The output of the flip-flop circuit 203 is delivered to a pair of gate circuits 207 and 208 which, in turn, are connected to flip-flop circuits 209 and 210, respectively. The output of flip-flop circuits 209 and 210 are delivered to a flip-flop circuit 211 through associated gate circuits 212 and 213, respectively. An oscillator circuit 216 is provided to deliver approximately 8 Hz to a counter circuit 217 substantially in the same manner as that shown with regard to the counter of FIG. 9. The output of the counter 217 is applied to a flip-flop circuit 218 which, in turn, has an output line 219 connected to diodes 220 and 221. The diodes 220 and 221 are used to gate transistors 222, 223, 224 and 225 when it is desirable to operate a motor control circuit 230.

The motor control circuit 230 includes a motor winding 231 which receives energizing current, in either one of two directions by means of a plurality of transistors associated therewith. For example, the motor 231 will run in one direction when transistor 233 is conductive providing a current path through the motor winding and the transistor 234. However, reverse direction of the motor is achieved when a transistor 236 is conductive thereby delivering current through a series-connected transistor 237. Transistor 237 is controlled as a result of conduction of the direct current coupled-transistor 238. Similarly, transistor 234 is rendered conductive by a direct current coupled-transistor 239. The motor drive circuit must be capable of driving the electric motor in both directions and therefore a bi-directional current flow control path is provided. The direction of rotation will be determined by which of the transistors is conductive. With a permanent magnet motor it is merely necessary to change the direction of current through the winding 231. When transistors 222 and 223 are rendered conductive transistors 238 and 236 are also rendered conductive. Transistor 238, in turn, turns on transistor 237 to apply energizing current to the motor winding 231. On the other hand, when transistors 224 and 225 are rendered conductive, transistors 223 and 239 are turned on. Transistor 239, in turn, renders transistor 234 conductive. This will produce a current flow control path through the motor winding in the opposite direction. The motor winding is provided with a diode shunt path to provide transient suppression of high voltages as a result of collapsing fields through the inductance forming the motor winding.

Figure 11:
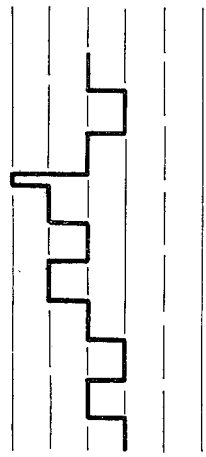
FIG. 11 is a waveform illustrating the output signals from the circuit of FIG. 10.

FIG. 11 illustrates the waveform obtained at the various flip-flop circuits during a single cycle of operation.

What has been described is a new and improved controlled population monitor used in conjunction with seed planting equipment and wherein a high degree of reliability and accuracy is obtained. While a single specific embodiment of the overall system has been illustrated herein, it will be understood that variations and modifications may be made to various circuit arrangements associated with the sub-assemblies or components without departing from the spirit and scope of the novel concepts disclosed and claimed herein.

The invention claimed is as follows:

1. A controlled population monitor for determining the number of seeds delivered to the ground from seed planting apparatus having a hopper for carrying seeds to be planted, seed dispensing means associated with the hopper for planting seeds in a plurality of spaced rows as the planting apparatus is transported over the ground and variable speed drive means coupled to said seed dispensing means for changing the rate at which seeds are dispensed; said monitor comprising seed sensor means mountable for association with said seed dispenser means for producing a first group of pulses which correspond in number substantially to the number of seeds actually dispensed by said seed dispensing means, distance-measuring means for producing a second group of pulses, each pulse of which corresponds to a predetermined increment of distance traveled by said planter apparatus over the ground, row width multiplier means responsive to each pulse of said second group of pulses for producing a third group of pulses corresponding in number to a predetermined increment of distance between the rows, and means responsive to said first, second and third groups of pulses to provide a signal to control said seed dispensing means.

2. The controlled population monitor as set forth in claim 1 further including selector means associated with said row width multiplier means for setting the number of pulses to be produced by each pulse of said second group of pulses, thereby allowing different row widths to be selected.

3. The controlled population monitor as set forth in claim 1 further including control means coupled between said variable drive means and said counting circuit means for controlling the rate of seeds being dispensed from said dispensing means in response to changes in the number of pulses of said first and third group of pulses.

4. The controlled population monitor as set forth in claim 1 further including, population multiplier means coupled to said row multiplier means for receiving said third group of pulses to alter the number of pulses associated therewith directly in accordance with a predetermined population density.

5. The controlled population monitor as set forth in claim 4 wherein said circuit means includes an up-down counter, a first circuit portion thereof receiving said first group of pulses for counting the counter in one direction, and a second circuit portion thereof for receiving said altered third group of pulses for counting the counter in the opposite direction, and said control signal is substantially in accordance with the difference from a center value of said up-down counter to control said variable drive means.

6. The controlled population monitor as set forth in claim 4 further including pulse-shaping means connected to said seed sensor for shaping said first group of pulses to have fast rise and fall times, and differentiating circuit means connected to said pulse-shaper for producing short time duration pulses corresponding to the seeds dispensed, whereby the possibility of overlapping pulses is substantially reduced to increase the accuracy of the seed sensing means.

7. The controlled population monitor as set forth in claim 1 wherein said distance-measuring means includes a rotating wheel having a plurality of spaced apart openings formed therein, a light source supported on one side of said rotating wheel, a pair of light-responsive means located on the other side of said wheel, said light-responsive means being angularly displaced from one another a distance corresponding to less than the distance between said openings, whereby alternate pulses from said first and second lightresponsive means are required to produce a single pulse for said second group of pulses, whereby extraneous signals are prevented from giving erroneous distance signal information.

8. The controlled population monitor as set forth in claim 7 wherein said plurality of spaced apart openings are evenly spaced apart.

9. The controlled population monitor as set forth in claim 8 wherein said light-responsive means are angularly displaced from one another a distance of approximately one-half the width between said openings.

10. The controlled population monitor as set forth in claim 7 wherein said light source is a light-emitting diode and said light-responsive means are a pair of photo-transistors, a flip-flop circuit having the set and reset inputs thereof coupled to said pair of photo-transistors for setting and resetting the same in response to alternate light pulses therefrom.

11. A distance-measuring device comprising: a wheel having a plurality of spaced apart openings formed about a peripheral margin portion thereof, light-emitting means supported on one side of said wheel to direct a light beam through said openings, photo-responsive means supported on the other side of said wheel to receive the light beam from said light-emitting means, said photo-responsive means having first and second photo-responsive portions spaced apart a distance less than the distance between said openings, and a flip-flop circuit having set and reset input terminals connected to said first and second light-responsive portions to be set and reset in response thereto to produce output pulses corresponding to a given distance travelled for each pair of pulses produced by said first and second light-responsive portions.

12. The distance measuring device as set forth in claim 11 wherein said plurality of spaced apart openings are evenly spaced apart.

13. The distance measuring device as set forth in claim 12 wherein said light-responsive means are angularly displaced from one another a distance of approxiamtely one-half the distance between said openings.

14. The distance-measuring device as set forth in claim 11 wherein said light source is a light-emitting diode.

15. The distance-measuring device as set forth in claim 11 wherein said light-responsive portions are first and second discrete photo-transistors.

16. The distance-measuring device as set forth in claim 11 wherein said first and second light-responsive portions are spaced apart a distance equal to approximately one-half the distance between said slots.

17. A seed-counting circuit for a plurality of simulataneously operated seed dispensing means comprising; pulse-producing means associated with each of said plurality of seed dispensing means, a buffer amplifier connected in circuit with said pulse-producing means, said buffer amplifier including pulse shaping circuit means for providing a rapid rise and fall time of the pulse produced by said seed sensor, differentiating circuit means connected to the output of said buffer amplifier for producing short time duration spiked pulses in response to the output of its associated seed sensor, and summer circuit means for receiving the spiked pulse output associated with each of said seed sensors, whereby the spiked pulses correspond only to the leading edge of the pulse produced by said seed sensor to produce a more accurate indication of the exact number of seeds being planted.

18. The seed counting circuit according to claim 17 wherein said pulse shaping circuit means of said buffer amplifier includes a positive feedback circuit for producing said fast rise and fall time at the leading and trailing edge of the output pulses passing therethrough.

* * * * *